(12) United States Patent
Freed

(10) Patent No.: US 7,080,123 B2
(45) Date of Patent: Jul. 18, 2006

(54) SYSTEM AND METHOD FOR PREVENTING UNNECESSARY MESSAGE DUPLICATION IN ELECTRONIC MAIL

(75) Inventor: Edwin Earl Freed, Claremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 686 days.

(21) Appl. No.: 09/955,964

(22) Filed: Sep. 20, 2001

(65) Prior Publication Data

US 2003/0055903 A1    Mar. 20, 2003

(51) Int. Cl.
*G06F 15/16* (2006.01)

(52) U.S. Cl. .................. 709/206; 709/220; 707/5; 705/14

(58) Field of Classification Search .............. 709/206, 709/218, 225, 227, 224, 223, 248; 710/5; 707/10, 1, 5; 705/14, 16
See application file for complete search history.

(56) References Cited

U.S. PATENT DOCUMENTS

| 5,870,548 | A  | * | 2/1999  | Nielsen ................ 709/206 |
| 6,052,735 | A  | * | 4/2000  | Ulrich et al. ............ 709/236 |
| 6,216,165 | B1 | * | 4/2001  | Woltz et al. ............. 709/232 |
| 6,370,566 | B1 | * | 4/2002  | Discolo et al. .......... 709/206 |
| 6,463,462 | B1 | * | 10/2002 | Smith et al. ............. 709/206 |
| 6,507,865 | B1 | * | 1/2003  | Hanson et al. .......... 709/206 |
| 6,549,957 | B1 | * | 4/2003  | Hanson et al. ............ 710/5 |
| 6,643,686 | B1 | * | 11/2003 | Hall ....................... 709/206 |
| 6,671,818 | B1 | * | 12/2003 | Mikurak ................... 714/4 |
| 6,909,708 | B1 | * | 6/2005  | Krishnaswamy et al. ... 370/352 |
| 2004/0181586 | A1 | * | 9/2004 | Morreale et al. ........ 709/206 |
| 2005/0021646 | A1 | * | 1/2005 | Kumar ................... 709/206 |

* cited by examiner

*Primary Examiner*—Khanh Quang Dinh
(74) *Attorney, Agent, or Firm*—Martine Penilla & Gencarella, LLP

(57) ABSTRACT

The system for preventing unnecessary message duplication in electronic mail forms a message digest of each message received. The message digest is then compared with stored message digests from previous messages to determine if there is a match. If there is a match, this means that the first and second messages are the same, and so the second message is discarded. If, on the other hand, there is no match, then the second message processed because it is assumed that it is a message that is a non-redundant message. The list of stored message digests is culled based on some predetermined criteria to ensure that it does not grow indefinitely.

15 Claims, 7 Drawing Sheets

SYSTEM AND METHOD FOR PREVENTING UNNECESSARY MESSAGE DUPLICATION IN ELECTRONIC MAIL

FIELD OF THE INVENTION

The present invention is in the field of electronic messaging systems, specifically aimed at preventing unnecessary duplication of messages, especially in Simple Mail Transfer Protocol.

BACKGROUND OF THE INVENTION

The Internet is a convenient and relatively inexpensive medium for high-speed communication, facilitating information exchange between individuals and organizations across the globe. One of the main means of achieving this type of communication over the Internet is through electronic mail (email), which can easily transport vast amounts of data between parties separated by large distances, almost instantaneously. Because of its convenience and inexpensive nature, email has become a communication staple, not only for correspondence between private individuals, but also for most business entities.

FIG. 1 shows a simplified view of a distributed communication system 100 with various networks interconnected through the Internet 108. Client computers (clients) 114a, 114b, and 114c are connected to local area network (LAN) 112, which is connected to server computer (server) 110. Likewise, clients 124a, 124b, and 124c are connected to LAN 122, which is connected to server 120. Finally, clients 134a and 134b are connected to LAN 132, which is connected to server 130. In turn, servers 110, 120, and 130 are connected to the Internet 108. The Internet 108, which connects the servers, comprises numerous interconnected computers, also known as routers, which pass data along to its destination. Before a source server (i.e., a server from which an email message is being sent) can forward a packet of data to a destination server (i.e., a server toward which an email message is directed), it must figure out the route, or at least the first part thereof, to send the data through. This is done with the help of Domain Name Servers 140, which translate textual Internet addresses into numeric Internet Protocol addresses.

On the Internet, as in any situation where two or more computers need to communicate, communication protocols are used. There is a layering of protocols, such that one protocol provides a most basic connection between two computers, a second protocol handles packets of information transmitted through the first protocol, and so on. Thus, each successive layer deals with information passed on to it from the previous layer, modifying or decoding that information in some way. On the Internet, the first and most basic layer is a network access layer, which facilitates communication between computers on the same LAN. The protocol used in this layer depends on the type of network hardware and setup. The second layer uses the Internet Protocol (IP), which establishes a simple connection between computers on different networks, facilitating communication between them. The third layer is the transport layer, using either Transmission Control Protocol (TCP) or User Datagram Protocol (UDP). This layer breaks up the information to be transmitted into smaller packets and monitors their arrival at the destination, allowing for more efficient transmission. The fourth layer, also called the application layer, provides a framework for high-level communication, including protocols such as File Transfer Protocol (FTP) and Telnet. These protocols can be used directly by the user, unlike the lower-level protocols which are generally hidden from the end-user. The application layer also contains some protocols which are not used as applications, but rather are implemented as parts of applications using a graphical user interface (GUI) or other relatively sophisticated user applications. One such protocol is the Hyper Text Transfer Protocol (HTTP) used in Internet browsers such as Netscape Navigator and Microsoft's Internet Explorer. Internet browsers use HTTP to communicate with servers on the Internet, displaying the data they receive in a graphical format.

The Simple Mail Transfer Protocol (SMTP) is also an application layer protocol usually used as part of a GUI application. Users can create email messages using applications such as Netscape Messenger or Microsoft Outlook, and the application then forwards the message towards its destination using SMTP. It is important to note that SMTP is not actually responsible for delivering mail to its ultimate destination, the recipient email server. Rather, as in FIG. 2, the protocol is a means for transporting email messages from the sending client 204, normally a personal computer or workstation, to the sending email server 208, through LAN 206. The email server contains software implementing SMTP, which allows it to communicate with the email client. Common examples of such software include Microsoft Exchange Server and Netscape Messaging Server. Each message is temporarily stored on the sending server 208, until it is forwarded to the recipient server 258 through the Internet 220. An exchange similar to the client-server interaction in 200 takes place on the recipient side 250, where the client 254 connects to the server 258 through LAN 256, and collects or "downloads" the email messages. Just as the sending server 208 stores messages temporarily before forwarding them to their destination, the recipient server 258 stores each message until it is retrieved by the email client 254.

SMTP provides a detailed set of instructions for communication between the client and the server during a transmission session. FIG. 3 illustrates what an SMTP session 300 normally looks like once a connection has already been established between the two machines (using TCP, for example). The client 302 transmits data to the server 304 piece by piece, awaiting confirmation after each piece is sent. Specifically, after the server informs the client that it is ready for an SMTP transmission by sending a "Server Ready" message 310, the client starts the session by sending a "HELLO" message 312. The server then sends confirmation of the start of the session in the form of a first "OK" message 314. The client then sends the server the email address of the user who created and is sending the email message, in the form of a "MAIL FROM" message 316. Once the server's confirmation in the form of a "Sender OK" message 318 has been received, the client forwards the address of each recipient through a "RCPT TO" message 320. The server then confirms receipt and validity of each address by sending a "Recipient OK" message 322. To indicate to the server that transmission of the list of recipients is complete, the client sends a "DATA" message 324. The server then tells the client to start transmission of the message headers and body by sending a "Send Message" message 326. The client then sends the message, indicating the end of the message body by transmitting a special carriage-return-line-feed (CRLF)-dot-CRLF sequence, as in 328. Upon receipt of this special delimiter, the server stores the message in step 336, and sends to the client a second "OK" message 330 to indicate receipt of the full message. The second "OK" message has the significance of indicating to the client that the server is now responsible for delivering the message to its destination, and the client need not do anything more in this matter. Once the client receives this message, it will send a "QUIT" message 332 to the server, and the server will respond with a "Goodbye" message 334, ending the session.

The forwarding of the message to the recipient(s) 338 can occur at any time after the server sends the second "OK" message 330, and is not dependent on any further communication between the server and the client. This can lead to the problem of message duplication because there is a limit to how long an email client will wait for a server's confirmation after transmitting a message to the server. If the confirmation does not arrive within a predetermined amount of time—say, a minute—the client will "time out" or terminate the connection. There are a variety of reasons why a confirmation may not arrive in a timely fashion, perhaps the most obvious being that the server may be slow due to heavy traffic. In fact, it is possible that a confirmation may never arrive if, for example, the confirmation or the message data itself were lost on the network, or the server was shut down at some point before sending a confirmation.

FIG. 4a represents such a "time-out" situation. In FIG. 4a, communication between the client 302 and the server 304 proceeds normally in steps 310 through 328, which are identical to steps 310 through 328 in FIG. 3, respectively. After receiving the message 328 from the client 302, the server 304 proceeds to store the message in step 436 and send a confirmation in the form of a second "OK" message 430. But in this case the server takes too long to issue the confirmation, and there is a time-out 440 on the client side. As previously noted, the server does not need to receive any more communication from the client in order to forward the message in step 438. Meanwhile, the client has no way of distinguishing between the situation where the message was never received by the server, and one where the confirmation from the server was (or will be) sent but will not be received until well after it is expected to arrive. The client 302 therefore assumes that there was a problem with message delivery to the server 304, and tries to transmit the message again later, as in FIG. 4b. In cases where the server did send a confirmation but simply took too long, the second attempt by the client will result in a duplicate message being sent, as described below.

In FIG. 4b, the client 452 establishes a new session with the server 454, and proceeds to transmit in steps 460 through 478 exactly the same information as was transmitted in FIG. 4a, in steps 310 through 328, respectively. The message stored in step 486 is therefore identical to that stored in step 436, and the transmission of that message in step 488 constitutes a duplicate message being sent. As in step 330, the server sends a second "OK" message in step 480, and the connection is mutually terminated in steps 482 and 484.

There are existing methods for minimizing or perhaps even eliminating the duplicate messaging problem. One approach is to set up the server to process messages and send confirmations quickly, thus reducing the number of timeouts that occur on the client side. While this technique is aimed at reducing unnecessary message duplication, it cannot be relied on to eliminate the problem. Nor is it always a practical solution. A second approach involves checkpointing—assigning a unique identifier to each message, which would allow the client to know whether a previous attempt to transmit a message was successful. While this technique would effectively eliminate the duplication problem, it requires implementation on both the server and client sides, and is in rare use today.

SUMMARY OF THE INVENTION

The present invention is directed to a system and method for a sending email server to reduce the unintended duplication of messages forwarded to email recipients. The invention implements a system where a first email message is used to form a first composite message, or "transaction", which is used to compute a first representative value. After the first composite message is formed, a second composite message is formed using a second email message. The second composite message is used to compute a second representative value, which is compared to said first representative value. In the system of the present invention, the second message is forwarded to the intended recipients only if the comparison between said first and second representative values does not indicate that the second email message is a duplicate of said first email message. The method of the present invention also includes a step of discarding at least one stored representative value based on at least one predetermined criterion.

In one aspect of the present invention, the representative values used are hash values. In another aspect, the first composite message is formed prior to receiving the second email message. In yet another aspect, the at least one stored representative value is discarded a predetermined time after it is created. In yet another aspect, the at least one representative value is discarded when the list of stored representative values grows to a predetermined size.

The present invention is also directed to a computer-readable storage medium having software code stored thereon, which carries out the method just discussed.

The present invention is also directed to an email server platform having a program memory associated therewith, the program memory comprising code configured to implement the method discussed above.

BRIEF DESCRIPTION OF THE DRAWINGS

The present invention can better be understood through the attached figures in which.

DETAILED DESCRIPTION OF THE INVENTION

Figure 1:
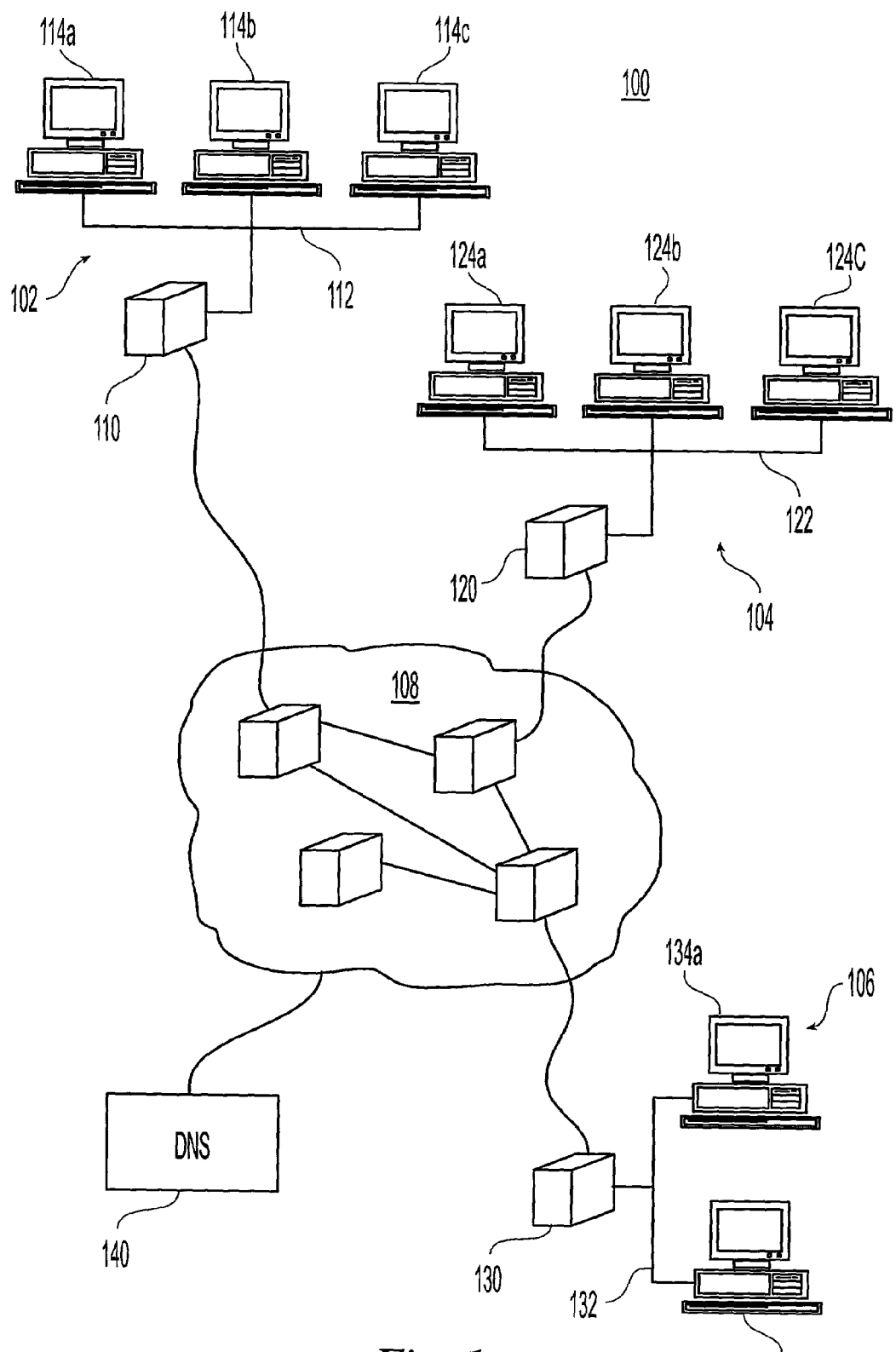
FIG. 1 presents an overview of how various computers and networks may be connected through the Internet, providing a system of transmission of data, such as email messages.
Figure 2:
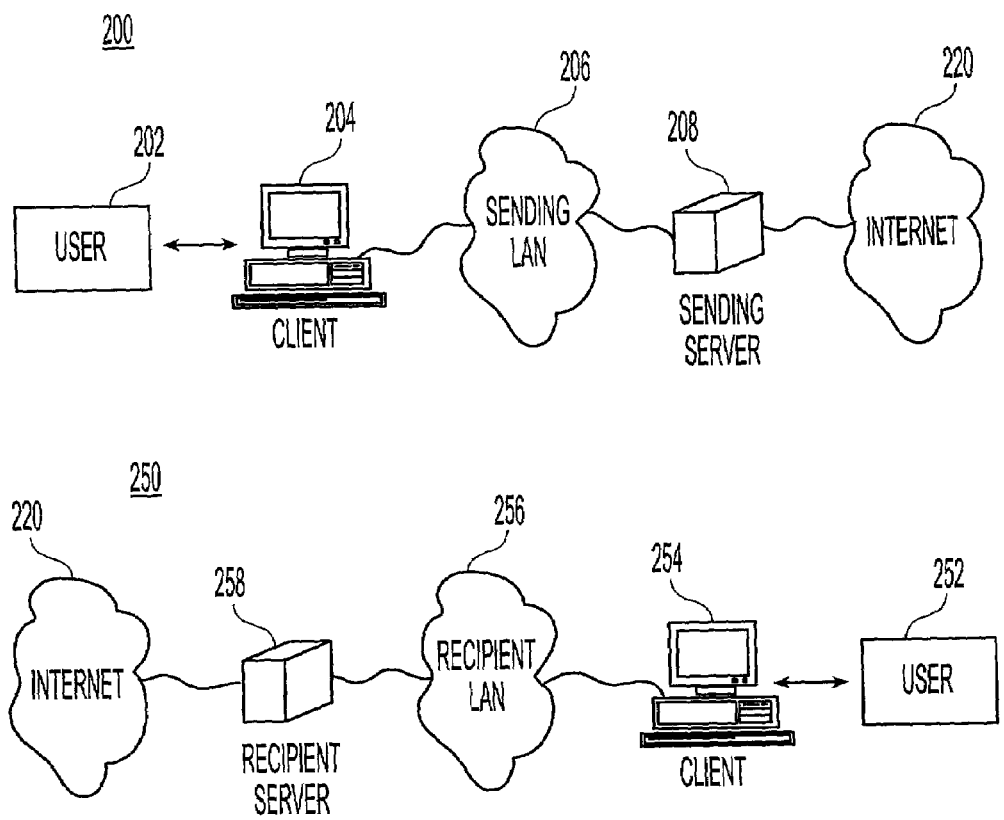
FIG. 2 presents the route normally taken by an email message, from the sending end-user to the receiving end-user.
Figure 3:
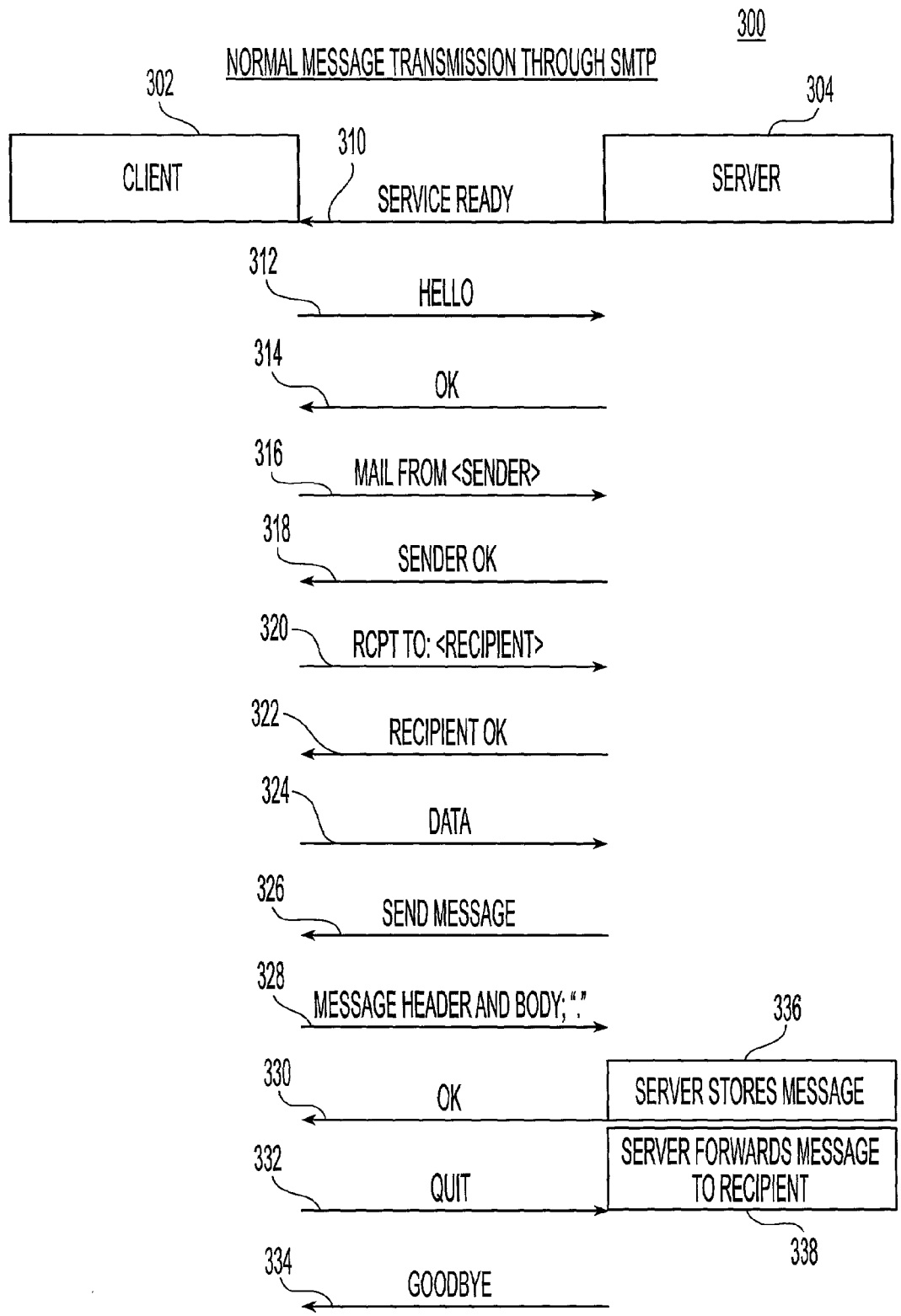
FIG. 3 presents a session between an email client and an email server on the originating end, and details of the communication between these two machines.

The present invention provides a method for the prevention of unnecessary duplication of messages which can be implemented solely on the sending server-side, without the need to modify the email client or its software in any way.

The invention is based on the observation that an SMTP client attempting to retransmit a message will usually use exactly the same sequence of commands and data as it did in the previous session, beginning with the "MAIL FROM" command, and up to and including the final "." delimiter. Thus a server could detect duplicate messages if it had some way to compare each message to those it recently received from the client. It would not be practical to attempt to store entire messages for the purpose of such comparisons, as the storage and calculation demands would overwhelm the server. Instead, in the present invention, the server calculates and stores a condensed digital representation of each message based on the commands and data transmitted by the client. The condensed digital representation, preferably in the form of a hash value, can be compared with previously stored hash values from earlier messages to determine whether the message is being duplicated.

The hash value for each message is calculated using a predetermined hash function. The purpose of the hash function is to perform a series of computations on the input string, in this case the message transmission session, resulting in a fixed-length string which, for comparison purposes, can be used to represent the entire message transmission session. It is therefore very important that the hash function used be collision-free, meaning given the hash function H, it must be computationally infeasible to find two different message transmission sequences x and y, such that $H(x)=H(y)$. This is to reduce the possibility of false detection of first-time transmissions as duplicates.

Various hash algorithms are available which facilitate the functionality described here. Two prominent examples of such algorithms are the Message Digest Algorithm (MD5) and the Secure Hash Algorithm (SHA). Each of these algorithms processes an input string to produce a fixed-length output by breaking the string into 32-bit (a bit is the smallest unit of information used in a digital system) words or blocks. The words are then subjected to mathematical operations, with the results used as input in subsequent operations. This system thus reduces the number of words until there are only as many words remaining as required by the hash algorithm in use. In the case of MD5, the computation stops when there are four words, or 128 bits, left. SHA produces a longer result of five words, or 160 bits. Such output sizes facilitate the collision-free functionality preferred in the hash function to be used in the implementation of the present invention. For example, MD5's output size of 128 bits allows the algorithm to produce up to $2^{128}$ different outputs, while SHA, with its 160-bit output size, can produce up to $2^{160}$ different output strings. Both MD5 and SHA are "one-way" hash functions, which means that given a hash value y, it would be computationally infeasible to calculate an input string x such that $H(x)=y$. More importantly, even a slight variation in the input string will very likely produce a different result. So, for example, hashing input strings which differ in just one character should result in distinguishable hash values.

The server needs only to store a hash value for any message whose transmission session did not end normally (i.e., where the server did not receive a "QUIT" message from the client after the server sent an "OK" message following message transmission). This is true since a "QUIT" message from the client indicates that the server's "OK" confirmation was received by the client, and therefore the client is aware of the transfer of responsibility for the message to the server.

In order to prevent the list of stored hash values from growing infinitely, the server should include some means of discarding older hash values which are probably no longer needed. One possible way to achieve this aim is to store, along with each hash value, a time stamp indicating when the hash value was computed. Then, periodically the server can check all stored time stamps, discarding ones which are older than a predetermined period of time, say, a week. Alternatively, the hash values can be stored using a first-in-first-out (FIFO) queue. This would allow the server, once the list grows to a predetermined size, to simply delete from the queue the oldest value each time it stores a new one, therefore keeping the size of the list constant. The server can safely delete older values because it becomes increasingly unlikely that a client will attempt to retransmit a message as time goes on. Clients normally attempt retransmission within minutes of the first transmission, so it is extremely unlikely that a duplicate message will be sent a week or more after the original message.

Figure 4A:
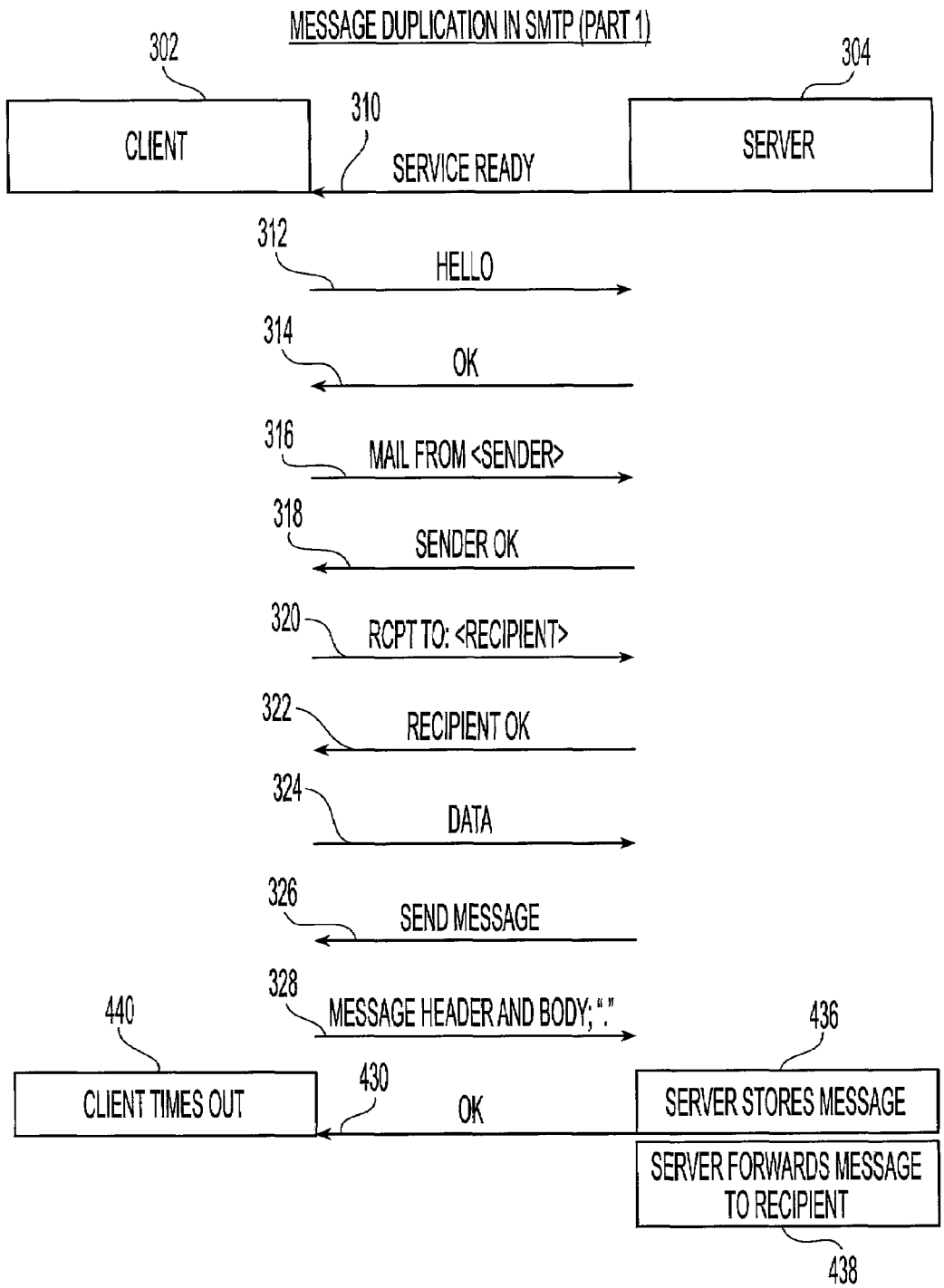
FIGS. 4a and 4b outline an email transmission session followed by a subsequent session resulting in unnecessary duplication of a message.
Figure 4B:
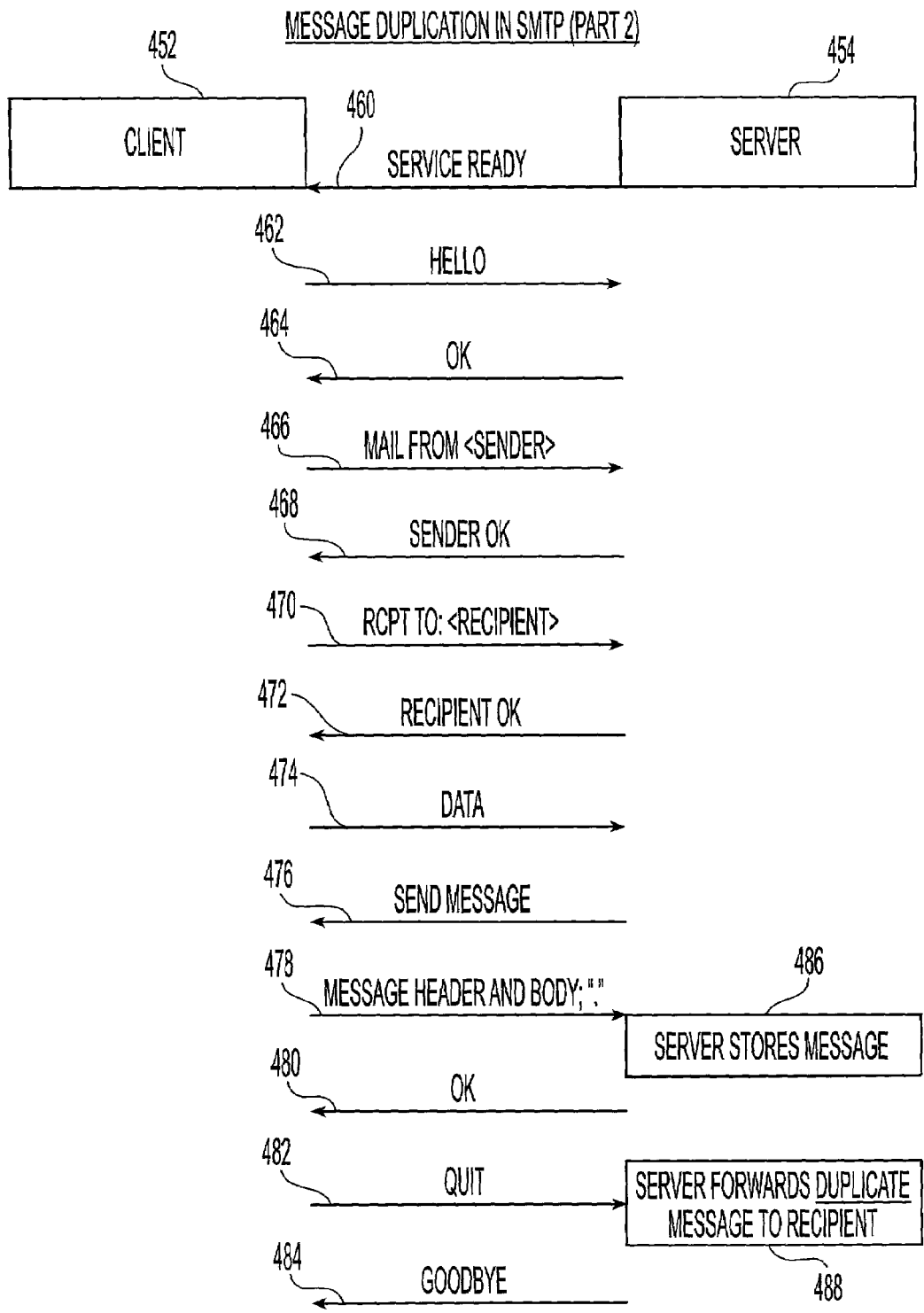
Figure 5A:
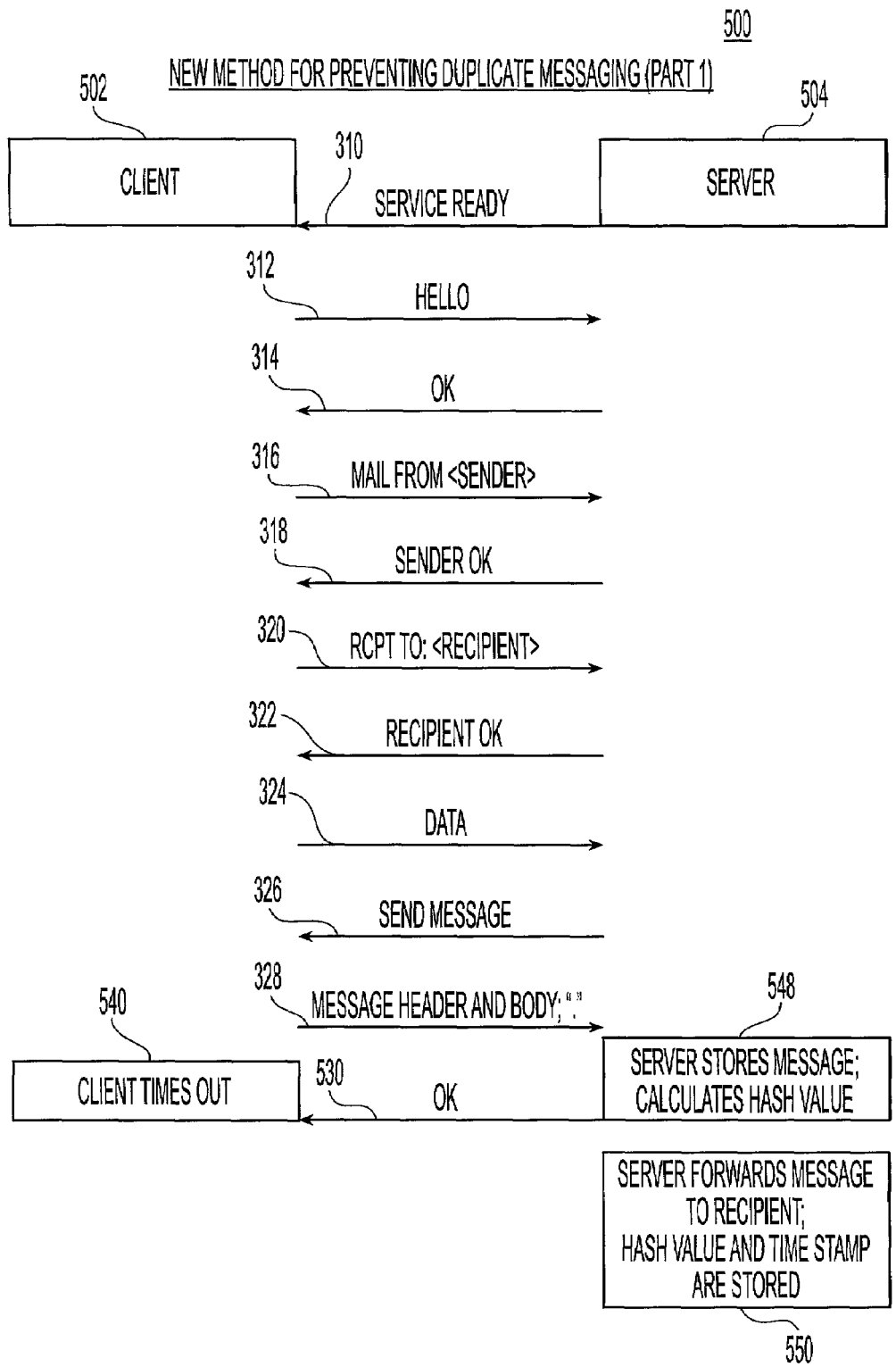
FIG. 5a demonstrates a method for preventing unwanted duplication of messages, in accordance with an embodiment of the present invention.
Figure 5B:
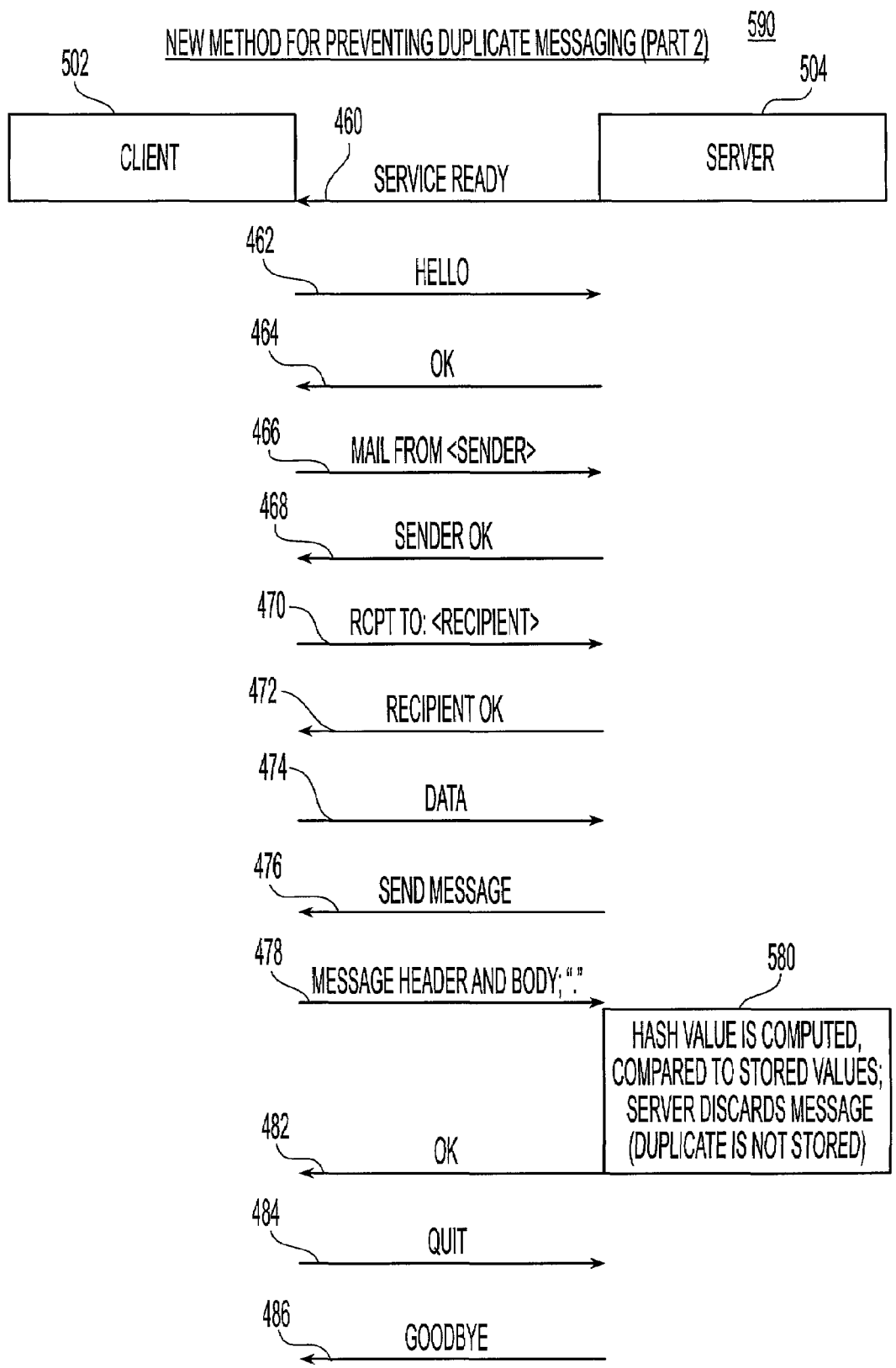
FIG. 5b demonstrates another method for preventing unwanted duplication of messages, in accordance with an embodiment of the present invention.

FIGS. 5a and 5b demonstrate how unwanted duplication is avoided using the present invention. In session 500, The client 502 establishes a session with the server 504 using the sequence of commands 310 through 328 which is substantially identical to that in FIG. 4a. In session 500, however, the server 504 computes a hash value for the information transmitted between the start of the session 312 and the last command received from the client 328. The data received by the server in steps 316, 320, and 328 is combined in some manner, preferably through concatenation, to form a "composite" message, commonly referred to as a "transaction." This composite message will become the input of the hash function in step 548. While it is possible to perform the hash function on the message content only (i.e., the data transmitted in step 328), it is preferable to include sender and recipient information in the composite, since this information will help ensure that messages which are identical in content (i.e., text, graphics, and attachments being sent), but from different senders or to different recipients, are not falsely detected as duplicates. In step 548, the content of the email message is stored by the server, along with the information needed to send the message toward its final destination, namely the sender's and each recipient's address, and calculation of the hash value for the composite message is completed. The server then compares the value it just calculated to all the previously stored values. If the server does not find a match, it will proceed to forward the message toward its destination. First, however, the server sends a second "OK" message 530 to the client. In this case, since the client has already timed out in step 540, the server does not receive a "QUIT" message from the client, and so the hash value and time stamp will be stored. FIG. 5b shows the client 502 some time later, attempting to retransmit the same message to the server 504, in session 590. Steps 460 through 478 in FIG. 5b are substantially identical to the corresponding steps in FIG. 4b, in that the client 502 is attempting to retransmit the same message to the server 504 because the client 502 timed out in the previous session 500. When the same situation arose in FIG. 4b, the server simply stored in step 486, and later forwarded the duplicate message in step 488. But here in FIG. 5b, the server 504, in step 580, compares the hash value calculated for the message to those previously stored, and finds that the value matches that calculated for session 500. The message is thus discarded in step 580, and no duplicate will be sent to the destination server. Since the second "OK" message 482 and the terminating messages 484 and 486 are still sent as usual, the session will look the same to the client 502 as it would in the system used in FIG. 4b, which allows the invention to be used in servers communicating with existing clients.

Thus, while this embodiment of the present invention does not spare the client from the task of retransmitting to the source server when a time-out occurs, it does lessen the likelihood that the source server will retransmit the same message when the client times-out due to the source server failing to send a message back to the client in a timely manner.

In the present invention, preferably no software changes are needed on the client computers; all changes are made on the source servers. This obviates the need to upgrade each client with software.

The present invention can be implemented in software already running on source email servers, as well as in new software yet to be created and installed. In the case of existing servers, the preferred implementation of the present invention is through the use of a software supplement or patch. The patch, usually an executable program run on the existing machine, will modify the existing software so as to implement the present invention. The advantage of this method, as compared to uninstalling existing software and installing new software in its place, is that it allows the invention to be implemented with minimal disruption in service by the source server. Of course any new server software, and even subsequent versions of existing software, can, and preferably would, implement the present invention directly.

While the present invention is preferably implemented in server software, it may require certain accommodations in the server's hardware. Most notably, both the amount of volatile memory (i.e., memory whose contents are lost when the machine is shut down) and size of non-volatile storage (e.g., hard disk space) of the server may need to be increased to accommodate the storage needed to store hash values and time stamps, as well as the potential increase in the size of the server software.

The present invention, whether implemented as a patch to present software, or integrated as part of new software, can be distributed through a variety of means. Popular means of distribution such as CD-ROM and floppy disks are obvious choices. These are examples of computer-readable storage media, any form of which may be used to contain and distribute an implementation of the present invention. Other examples of such media include digital video disks (DVDs) and other optical media, read-only memory (ROM), magnetic tape, and hard disks.

Alternatively, the software may be available for download directly over the Internet. Of course, the software may also be installed on a server before the server is delivered from a vendor. Preferably, each consumer will be able to choose among these options, according to the individual circumstances.

While the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A method for an email server to reduce the unintended duplication of messages forwarded to an email recipient, comprising:
   forming a first composite message comprising a first email message sent by a client to the email server;
   computing and storing a first representative value in the email server for said first composite message when the email server does not receive a confirmation from a client in response to a receipt message sent by the email server, the receipt message representing an acknowledgement for the client that the email server received the message in full;
   forming, after said first composite message, a second composite message comprising a second email message;
   computing a second representative value for said second composite message;
   comparing said first and second representative values;
   forwarding said second email message to an email recipient only if the comparison of said first and second representative values do not indicate duplication; and
   discarding at least one stored representative value from the email server based on at least one predetermined criterion.

2. The method of claim 1, wherein said first and second representative values are hash values.

3. The method of claim 1, wherein said first composite message is formed prior to receiving said second email message.

4. The method of claim 1, wherein the at least one stored representative value is discarded in a predetermined time after it is created.

5. The method of claim 1, wherein at least one stored representative value is discarded when the list of stored representative values grows to a predetermined size.

6. A computer-readable storage medium having software code stored thereon, the code comprising:
   code to form a first composite message comprising a first email message sent by a client to an email server;
   code to compute and store a first representative value in the email server for said first composite message when the email server does not receive a confirmation from a client in response to a receipt message sent by the email server, the receipt message representing an acknowledgement for the client that the email server received the message in full;
   code to form, after said first composite message, a second composite message comprising a second email message sent by the client to the email server;
   code to compute a second representative value for said second composite message;
   code to compare said first and second representative values;
   code to forward said second email message to an email recipient only if the comparison of said first and second representative values do not indicate duplication; and
   code to discard at least one stored representative value from the server based on at least one predetermined criterion.

7. The computer-readable storage medium of claim 6, wherein the code to compute said first and second representative values comprises code to compute hash values.

8. The computer-readable storage medium of claim 6, wherein the code to compute said representative values comprises code to form said first composite message prior to receiving said second email message.

9. The computer-readable storage medium of claim 6, wherein the code to discard at least one stored representative value comprises code to discard such value in a predetermined time after it is created.

10. The computer-readable storage medium of claim 6, wherein the code to discard at least one stored representative value comprises code to discard such value when the list of stored values grows to a predetermined size.

11. An email server platform having a program memory associated therewith, the program memory comprising software code configured to:
- form a first composite message comprising a first email message;
- compute and store a first representative value in the server for said first composite message when the email server does not receive a confirmation from a client in response to a receipt message sent by the email server, the receipt message representing an acknowledgement for the client that the email server received the message in full;
- form, after said first composite message, a second composite message comprising a second email message;
- compute a second representative value for said second composite message;
- compare said first and second representative values;
- forward said second email message to an email recipient only if the comparison of said first and second representative values do not indicate duplication; and
- discard at least one stored representative value in the server based on at least one predetermined criterion.

12. The server of claim 11, wherein the code to compute said first and second representative values comprises code to compute hash values.

13. The server of claim 11, wherein the code to compute said representative values comprises code to form said first composite message prior to receiving said second email message.

14. The server of claim 11, wherein at least one stored representative value is discarded in a predetermined time after it is created.

15. The server of claim 11, wherein at least one stored representative value is discarded when the list of stored representative values grows to a predetermined size.

* * * * *